United States Patent
Davies et al.

(10) Patent No.: US 11,048,491 B1
(45) Date of Patent: Jun. 29, 2021

(54) CLOUD ON-DEMAND STAGING ENVIRONMENTS

(71) Applicant: MICROSOFT TECHNOLOGY LICENSING, LLC, Redmond, WA (US)

(72) Inventors: Joseph G. Davies, Leavenworth, WA (US); Tracy D. Paddock, Covington, WA (US); Kelley D. Vice, Everson, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/872,183

(22) Filed: May 11, 2020

(51) Int. Cl.
    *H04L 29/08* (2006.01)
    *H04L 29/06* (2006.01)
    *G06F 9/455* (2018.01)
    *G06F 9/50* (2006.01)
    *G06F 11/36* (2006.01)
    *G06F 8/60* (2018.01)
    *G06F 9/451* (2018.01)

(52) U.S. Cl.
    CPC .............. *G06F 8/60* (2013.01); *G06F 9/451* (2018.02); *G06F 11/3664* (2013.01); *G06F 11/3668* (2013.01)

(58) Field of Classification Search
    CPC .... G06F 9/45558; G06F 9/451; G06F 9/5072; G06F 2009/4557; G06F 8/60; G06F 11/3664; G06F 11/3668; H04L 67/1002
    See application file for complete search history.

(56) References Cited

U.S. PATENT DOCUMENTS

| | | | |
|---|---|---|---|
| 9,104,803 B2 | 8/2015 | Mansour et al. | |
| 9,141,514 B1 | 9/2015 | Pavlovitch et al. | |
| 9,229,845 B1 | 1/2016 | Chandrasekharapuram et al. | |
| 10,439,925 B2 | 10/2019 | Jones et al. | |
| 2014/0351301 A1 | 11/2014 | Yandek et al. | |
| 2018/0046509 A1* | 2/2018 | Arata | G06F 9/46 |
| 2019/0370471 A1 | 12/2019 | Petratos et al. | |

OTHER PUBLICATIONS

Amarasinghe et al., SDN-Based Framework for Infrastructure as a Service Clouds, 8 pages (Year: 2016).*
"Setting up a test staging environment with production data", Retrieved from: https://www.ibm.com/support/knowledgecenter/en/SSYMRC_6.0.2/com.ibm.jazz.install.doc/topics/t_prepare_sandbox_server_rename.html, Dec. 16, 2019, 9 Pages.
"WP Engine Legacy 1-Click Staging Overview", Retrieved from: https://web.archive.org/web/20190902213148/https:/wpengine.com/support/staging/, Sep. 2, 2019, 12 Pages.
Anderiasch, Florian, "One-click Deployment", Retrieved from: https://blog.mayflower.de/800-07.12.-One-click-Deployment.html, Dec. 6, 2011, 5 Pages.

* cited by examiner

*Primary Examiner* — Thuy Dao
(74) *Attorney, Agent, or Firm* — NovoTechIP International PLLC

(57) ABSTRACT

On-demand cloud-based staging environments can be rapidly created as mirrors of a production environment. By defaulting to the production environment's parameters but allowing the user to edit parameters before creating the new cloud-based staging environment, much of the work of creating staging environments can be automated. Users can create staging environments quickly and easily, so that environments can be used for a single project and dismissed, instead of having to maintain them and continuously synchronize them with changes in the production environment.

20 Claims, 9 Drawing Sheets

400

New On-Demand Staging Environment

| | | |
|---:|:---|:---:|
| Environment name * | Contoso-stage00x.onmicrosoft.com | 402 |
| Custom DNS domain name * | ODSE00x.contoso.com | 404 |
| Number of licenses * | 5 | ••• 406 |
| User accounts and groups ☒ | All users | ••• 408 |
| Teams ☐ | \<none\> | ••• 410 |
| SharePoint Online sites ☐ | \<none\> | ••• |
| Exchange Online mailboxes ☒ | All users | ••• |

Build it 412

Fig. 4

CLOUD ON-DEMAND STAGING ENVIRONMENTS

TECHNICAL FIELD

The present application relates generally to staging environments for software development, implementation testing, security procedures, and troubleshooting, and more specifically to systems and methods for rapidly generating staging environments corresponding to a particular subscription to cloud services.

BACKGROUND

A staging environment is an environment for testing or other purposes that mirrors a production environment but is isolated from it. Staging environments provide a way to safely validate changes in an isolated space with the same service configurations, dependencies, customizations and constituent parts as the production environment to which they will ultimately be deployed. These environments enable admins, developers and implementers to verify that code, feature configurations, and troubleshooting issue resolutions will work as expected without compromising the production environment and creating new problems, downtime, or costly maintenance windows. They may also be used for load testing or other types of performance testing, or to preview new features or to validate integrations of new features with existing ones without impacting users.

However, replicating the crucial aspects of what may be a highly complex production environment can be a major project, which may require dedicated staff, complex procedures, ongoing maintenance and automation. IT teams who omit staging from their change management lifecycle pay a price: breaking changes, productivity loss due to unexpected downtime, unreliability and service interruptions. It would be desirable to be able to set up staging environments quickly and easily that mirror a given production environment, particularly in a cloud-based subscription system.

SUMMARY

In one aspect, a system for providing staging environments to a cloud service subscriber having a production environment includes a processor and machine-readable media including instructions. The instructions, when executed by the processor, cause the processor to receive a request from the subscriber to create a staging environment via a request user interface (UI), and in response to the received request, access information on subscribed services for the subscriber, present to the subscriber a selection UI showing a set of currently subscribed services for the production environment, the selection UI being populated with the accessed information and configured for selection of subscribed services for inclusion in the staging environment. The instructions further cause the processor to receive from the subscriber a selection of a subset of currently subscribed services via the selection UI, and, in response to reception of the selection of a subset of currently subscribed services, create a new cloud service subscription for a new staging environment including the selected subset of currently subscribed services, the new staging environment being isolated from the production environment and having a setting matching the production environment. The instructions further cause the processor to grant the subscriber access to the new cloud service subscription for the new staging environment.

In another aspect, a method of constructing a custom staging environment for a subscriber includes receiving a request from the subscriber to construct a staging environment via a request user interface (UI), and in response to the received request, identifying a current subscription to cloud services for the subscriber, the identified current subscription including a subscribed set of deployed services. The method further includes offering a selection UI allowing the subscriber to select a subset of the subscribed set of deployed services, and in response to the subscriber completing the selection UI, creating a new subscription for a staging environment isolated from a production environment including the selected subset. The staging environment has an original configuration including a setting matching the production environment. The method further includes adding the created subscription to a list of environments accessible to the subscriber via an environment UI.

In another aspect, a method of creating a custom staging environment on a subscription service for a subscriber includes sending a request to the subscription service for creation of a new staging environment and receiving from the subscription service a services control showing current subscription parameters for a production environment. The method further includes using the received services control to select a subset of the subscription parameters for the new staging environment, and receiving a link from the subscription service to the new staging environment, the new staging environment having the selected subset of parameters and being isolated from the production environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 is a dialog box allowing a user to create a new ODSE based on production environment parameters.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Current solutions for creating staging environments are typically detailed instructions to manually configure and customize infrastructure that duplicates a production environment. These processes must be repeated for each new staging environment. Multiple staging environments are needed, because having multiple developers use the same staging environment tenant for different projects at the same time makes it very difficult to maintain a configuration that is synchronized with the production environment. The ability to quickly create new and separate staging environments means that each project can have its own staging environment, saving time in the manual creation and maintenance. For example, each developer can work on an environment dedicated to testing their apps in isolation.

As used herein, a "production environment" includes a working environment that users (who may not be IT professionals) use to accomplish work. For example, a production environment may include user accounts and groups, and services such as email (e.g., Outlook, Gmail, or ProtonMail), document management (e.g. Sharepoint, Dropbox, or Google Drive), collaboration services (e.g., Microsoft Teams), security services (e.g., Office 365 Advanced Threat Protection), a content delivery network (e.g., Azure, Cloudflare, or Google Cloud), and/or various other services.

As used herein, a "staging environment" includes a test environment that typically reproduces many of the features of a production environment but is not used for production. The staging environment generally has an amalgamation of settings, user accounts and groups, features, and configurations that are derived from an existing tenant (production) environment. The configuration of any particular staging environment is currently manually created by determining which parts of the production environment are germane to the reason for creating the staging environment. For example, if it is desired to implement a new multi-factor authentication system for email, the staging environment may include replicas of most or all of the user accounts and groups of the production environment and existing email tools and mailboxes, but document management may be omitted.

Figure 1:
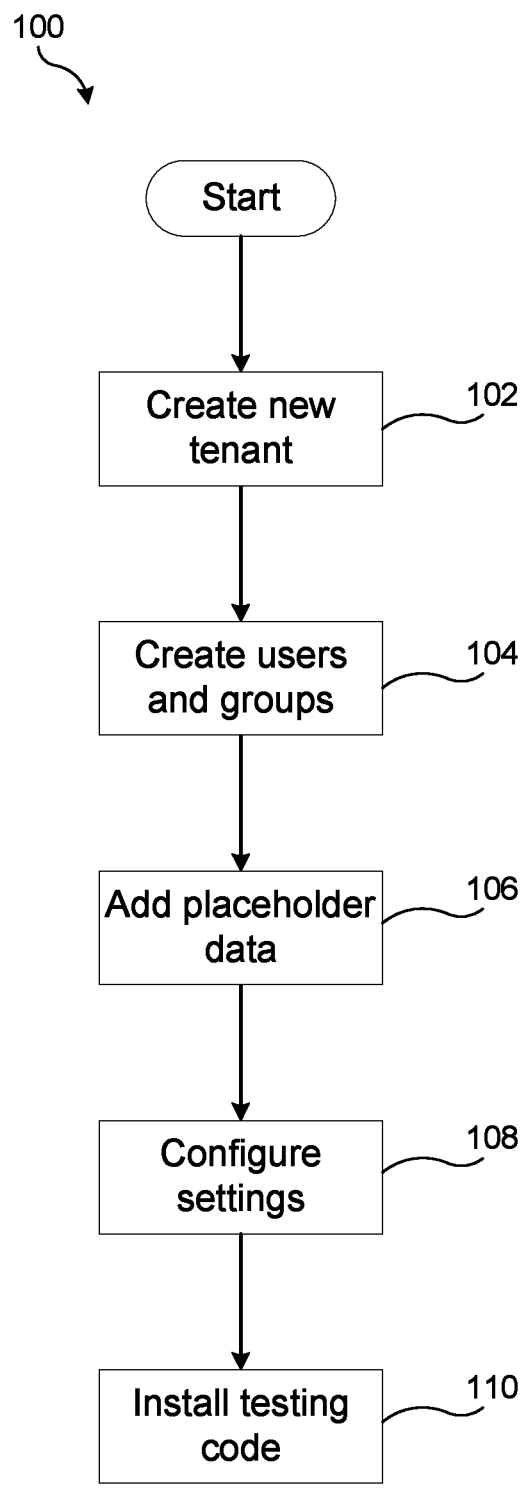
FIG. 1 is a flow diagram depicting the prior art steps in a method described herein of manually creating a staging environment for testing a software installation process.

FIG. 1 is a flow diagram 100 showing steps involved in constructing a staging environment to test a software installation package using existing methods. It will be understood that the steps may be carried out in a different order from that depicted in FIG. 1. The staging environment needs to mirror the production environment in ways relevant to testing the installation, but it is generally preferred not to mirror elements of the production environment that are not germane to installation to avoid wasting resources. The first step 102 is to create a new tenant (a cloud subscription). The tenant may include all of the subscribed services of the production environment, or it may include only a subset of them if some services are not relevant to the purpose of the staging environment. In some implementations, the tenant may include services that are not part of the production subscription, for example if a developer wishes to experiment with other services that they are considering adding to the subscription.

The new tenant must be populated with users and groups (step 104). When creating a staging environment manually, a developer may create information that may be in the form of a list of user accounts that matches some or all of the production user accounts, or they may create a list of imaginary users of suitable size for the test they wish to perform. In some implementations, the users may be divided into groups (for example, corporate departments). For the example mentioned above where the staging environment is to test a multi-factor authentication system for email, a developer may create several user accounts and at least one or two groups, but might not wish to reproduce an entire organization's directory.

Once the staging environment is populated with users and groups, the developer may add placeholder data (step 106). For example, the developer might create some dummy emails among the created users, or might create working documents as part of a document management system. Next, the developer must configure settings for the new tenant (step 108). Example settings might include global settings like subscriptions and number of user licenses, domain name, password settings, admin roles, or mobile app protection policies, and/or feature-level settings like external sharing, permissions, and file and folder links; access control settings for unmanaged devices, idle session timeout, network location, and legacy apps; notifications; or site creation defaults and storage limits. Finally, the developer installs code to be tested (step 110). For example, in the multi-factor authorization example, the developer might install code requiring a new verification method for multi-factor authorization when logging into the email client. In other staging environment scenarios, this step may be absent (for example, when the developer wishes to load test the existing system to make sure it can handle an influx of new users), or it may involve adding other subscriptions or other variations on the production environment.

Staging environments can be expensive to construct and maintain. The new environment typically requires a new subscription to cloud services, and the steps described above for populating the environment can be time-consuming and burdensome. If the environment is expected to last for more than a few days, it may require maintenance, making sure that it continues to match any changes in the production environment. If a staging environment is used for more than one project, a scheduling system should be implemented, and the environment should be periodically reset to its baseline state so that errors are not introduced during use and then propagated to new projects. It would be preferable to have an easier way of creating a staging environment that matches the production environment in whatever ways are important to the intended use of the staging environment, and then to dismiss it entirely instead of trying to maintain it for reuse.

Figure 2:
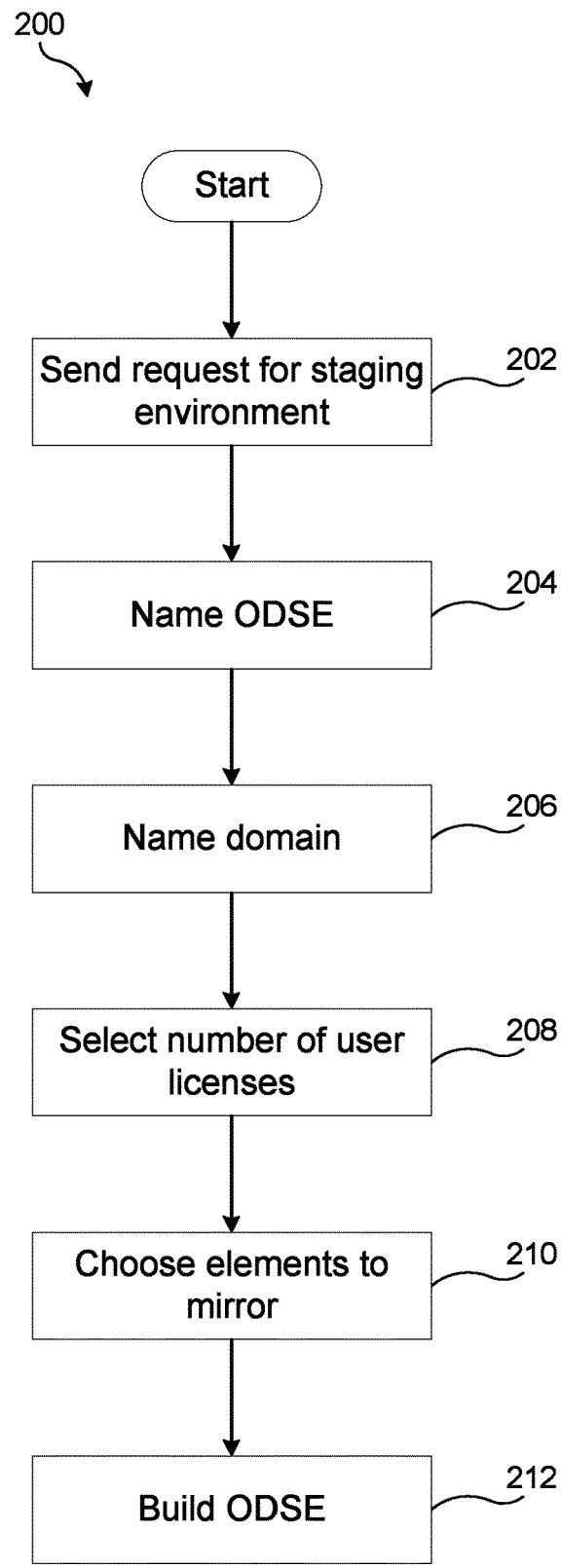
FIG. 2 is a flow diagram depicting the steps in establishing an on-demand staging environment (ODSE) according to the instant method.

FIG. 2 is a flow diagram 200 showing steps of the instant on-demand staging environment (ODSE) method of creating a staging environment based on a current production environment. Rather than manually setting up each of the elements shown in FIG. 1, a user starts by initiating creation through an environment creation portal user interface (UI) provided by the subscription service. (The portal UI is discussed in more detail with reference to FIG. 3, FIG. 4, and FIG. 5.) The user sends a request to create a staging environment based on it (step 202). The subscription service then prompts the user via dialog box(es) (or other equivalent selection controls such as a command-line interface such as Microsoft PowerShell) to name the ODSE (step 204) and to select other parameters of the environment. The dialog box may provide a default DNS name for the new ODSE, but the user may prefer to give it a different custom DNS name (step 206). The user selects a number of user licenses for the new ODSE (step 208) and chooses other elements of the production environment to mirror (step 210), as further described below with reference to FIG. 3, FIG. 4, and FIG. 5. These elements may default to being the same as the production environment upon which the ODSE is based, but may be modified by the user as appropriate to the task at hand. When the parameters for the ODSE are satisfactory to the user, the user can select a "build ODSE" creation control to automatically create the new staging environment (step 212). The subscription service creates a new subscription according to the parameters selected by the user and places it on a list of accessible environments, where it may be used by the same user or by other users with the appropriate administrative role for the subscription. Before creating the new staging environment, the subscription service may also first perform administrative tasks such as checking to see if the request would exceed existing limits for the subscription on user licenses or number of environments, and if so, warning the user that the request may result in additional fees. Other such administrative tasks might include generating new passwords for the accounts in the staging subscription to allow the developer to sign-in as specific users but without requiring the password of the production subscription.

Figure 3:
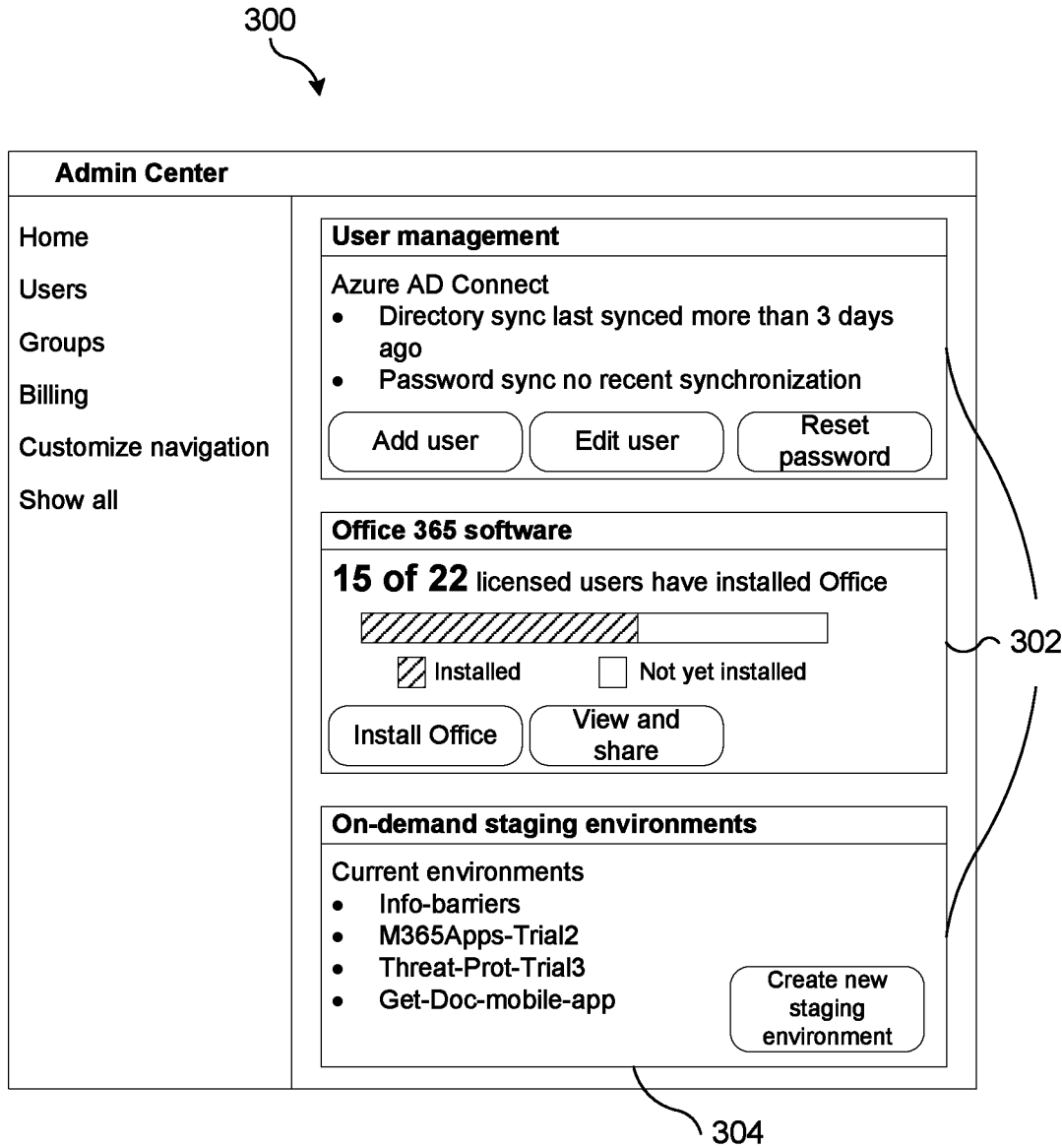
FIG. 3 is an example user interface for listing current ODSEs and for creating an ODSE.

FIG. 3 is an example UI 300 as discussed above in connection with FIG. 2. In this example, the UI is implemented as a "card" within a Microsoft™ 365 admin center for the production environment, but it will be understood that the details of the UI may differ for different subscription services. The illustrated UI includes multiple cards 302 for administration of an Office 365™ system, including "User management," "Office 365 software," and "On-Demand Staging Environments" 304. The ODSE card 304 includes a list of current staging environments 306 and a button 308 to "Create new staging environment." If the latter button is selected by the user, a dialog box as shown in FIG. 4 allows the user to select parameters of the staging environment.

FIG. 4 is the dialog box 400 that allows the user to determine the parameters of the staging environment. The dialog box 400 includes a field 402 for choosing a staging environment name. As illustrated, field 404 allows the user to set a DNS name for the environment. In some implementations, an automatically-generated DNS name may be prefilled in field 404, but may be edited by the user if they wish to use a different name. Field 406 allows the user to select a number of licenses for the ODSE. The number of licenses to use for a staging environment depends on the purpose of the environment and on the details of the subscription. For example, when the instant methods are implemented on a subscription service, staging environment licenses may be taken from a production subscription license pool (e.g., a staging environment can use available licenses from a subscription with 500 licenses when plenty are available, with the option of paying for additional temporary licenses). When a user needs to create more user accounts with licenses in the ODSE, the dialog may include an options button 408 for specifying an expiration time and/or a payment method for additional subscriptions. Pressing this button leads to another dialog box (not shown) that allows the user to specify a time limit for the ODSE and/or to select a payment method.

Dialog box 400 also includes a list 410 of features of the production environment that the user may wish to include or change for the ODSE. In the illustrated implementation, each feature of list 410 defaults to the value of that feature for the production environment, but the user may customize any of them by choosing the corresponding " . . . " button 412. As illustrated, each feature of list 410 is by default checked (meaning that it will be mirrored in the ODSE), but the user may choose to uncheck any of them, as they have done for "Teams" and "SharePoint Online sites" in FIG. 4. If the user clicks button 412 for "Exchange Online mailboxes," another dialog box allows them to customize the mailboxes that will be recreated in the new environment, as shown below in FIG. 5.

Figure 5:
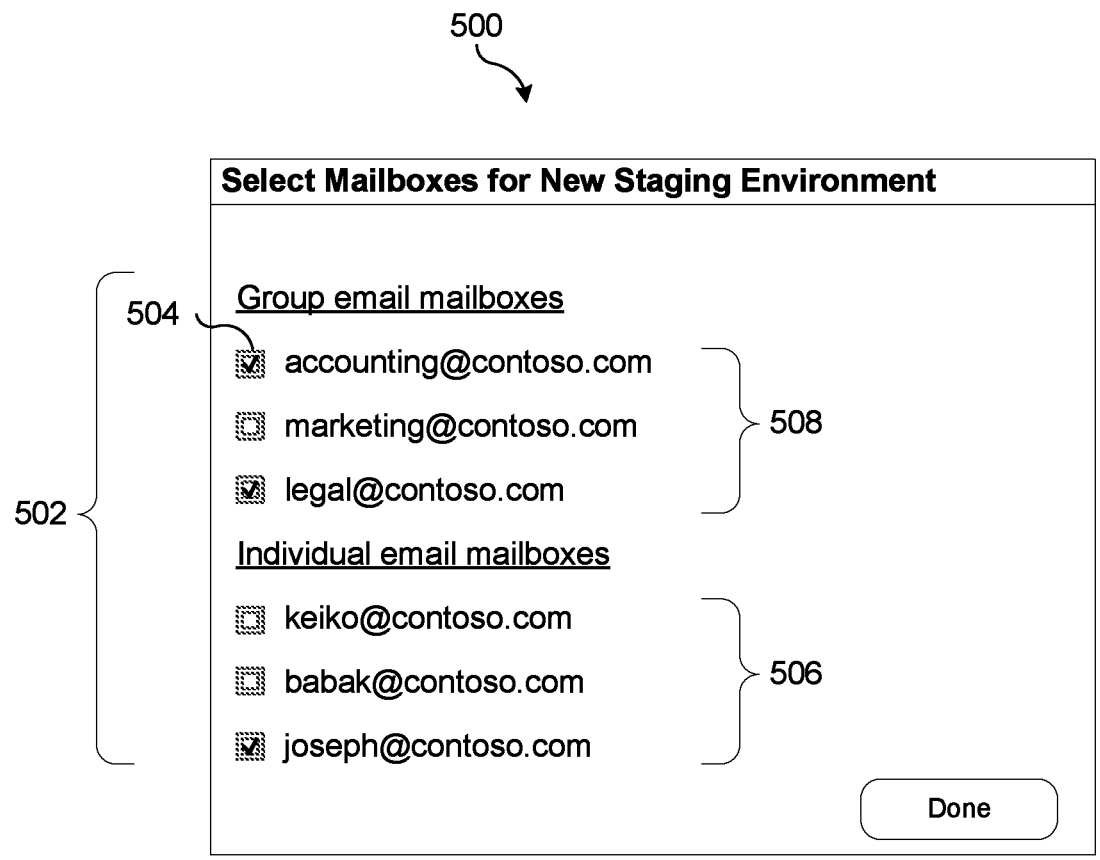
FIG. 5 is a dialog box allowing the user to customize mailboxes for the ODSE being created.

FIG. 5 shows an example UI for customizing a parameter of the ODSE, specifically for customizing Exchange Online mailboxes. It will be understood that any of the default features of list 410 may have a similar dialog box, but that the details may depend on the possible values for the feature. Window 500 shows a list 502 of Exchange Online mailbox accounts, each with a checkbox 504 allowing the user to choose whether the account will be part of the ODSE. Illustrated window 500 is divided into user accounts 506 and group accounts 508, but it will be understood that in other implementations, accounts may be grouped differently. For example, users may be grouped by corporate department or by location so that such subgroups may be easily selected.

Protections may also be provided to protect against a nefarious user with global admin privileges. For example, it would be undesirable to permit such a user to create a staging environment with only the CEO's mailbox installed so that they may try to hack the email password undetected. In one implementation, these protections might take the form of requiring additional credentials to access the dialog shown in FIG. 5. Some implementations may include keylogging or other systems of tracking user activity in the ODSE so that ill-intentioned users can be detected before they damage a production environment. As another solution that may be implemented alone or in combination with the previous method, some implementations may include creating new passwords and randomly-generated placeholder text for email, documents, chats, or other data for chosen user accounts (which may be but need not necessarily be all user accounts) as part of creation of the ODSE.

Returning to FIG. 4, once the user has customized parameters and modified any details as described above in correction with FIG. 5, they select the "Build it" button 412. In response to selecting this control, the subscription service creates the new tenant for the new ODSE, populating it according to the parameters selected in window 400 and (if used) window(s) 500. Once the new tenant is created, the subscription service places it on the list of environments 306 shown in FIG. 3. In the illustrated implementation, it may be accessed by any user having global admin privileges for the production environment, but in other implementations, setting permissions for the new ODSE may be part of the setup process.

Figure 6:
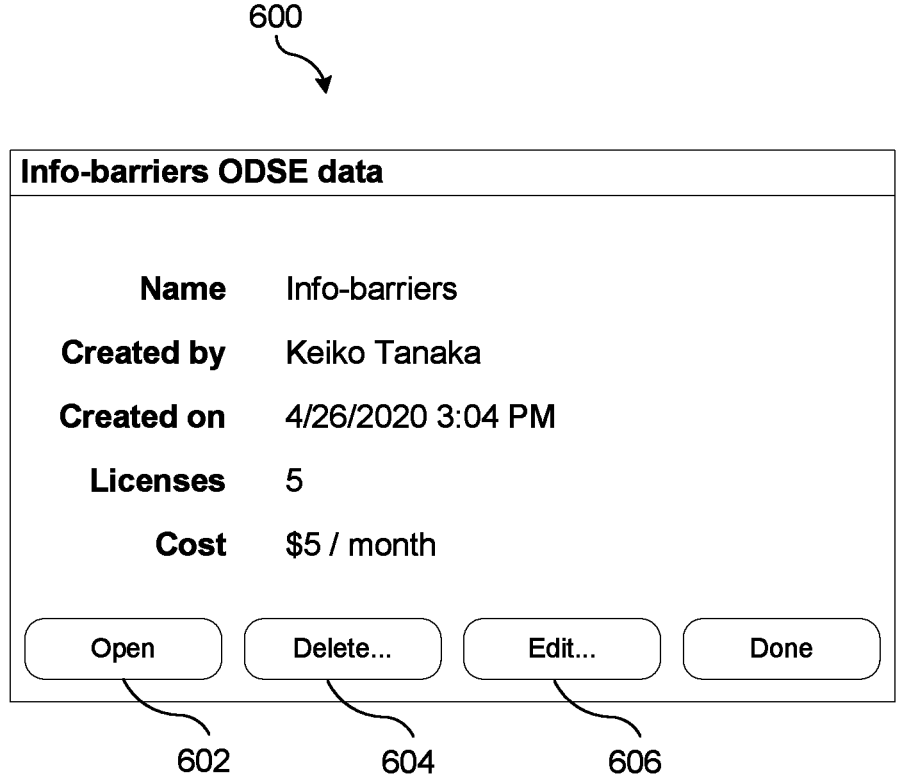
FIG. 6 is an information pane showing data about an existing ODSE.

Returning to FIG. 3, in some implementations, the list of staging environments 304 may be interactive. For example, if a user clicks on one of the current staging environments 304, a new pane may display information about that staging environment as shown in FIG. 6. Information pane 600 shows data for the staging environment Info-barriers shown in FIG. 3. In the illustrated implementation, it shows the name, creator, creation time, number of user licenses allocated to the environment, and incremental cost to the organization of having the environment. In addition, several control buttons are available. Button 602 allows the user to enter the staging environment, for example to do development work there. Button 604 allows the user to delete the staging environment via another dialog. (In some implementations, using this button will require credentials so that work is not accidentally deleted.) Button 606 allows the user to access ODSE details such as change history, log files, admin notes, and troubleshooting packages.

Figure 7:
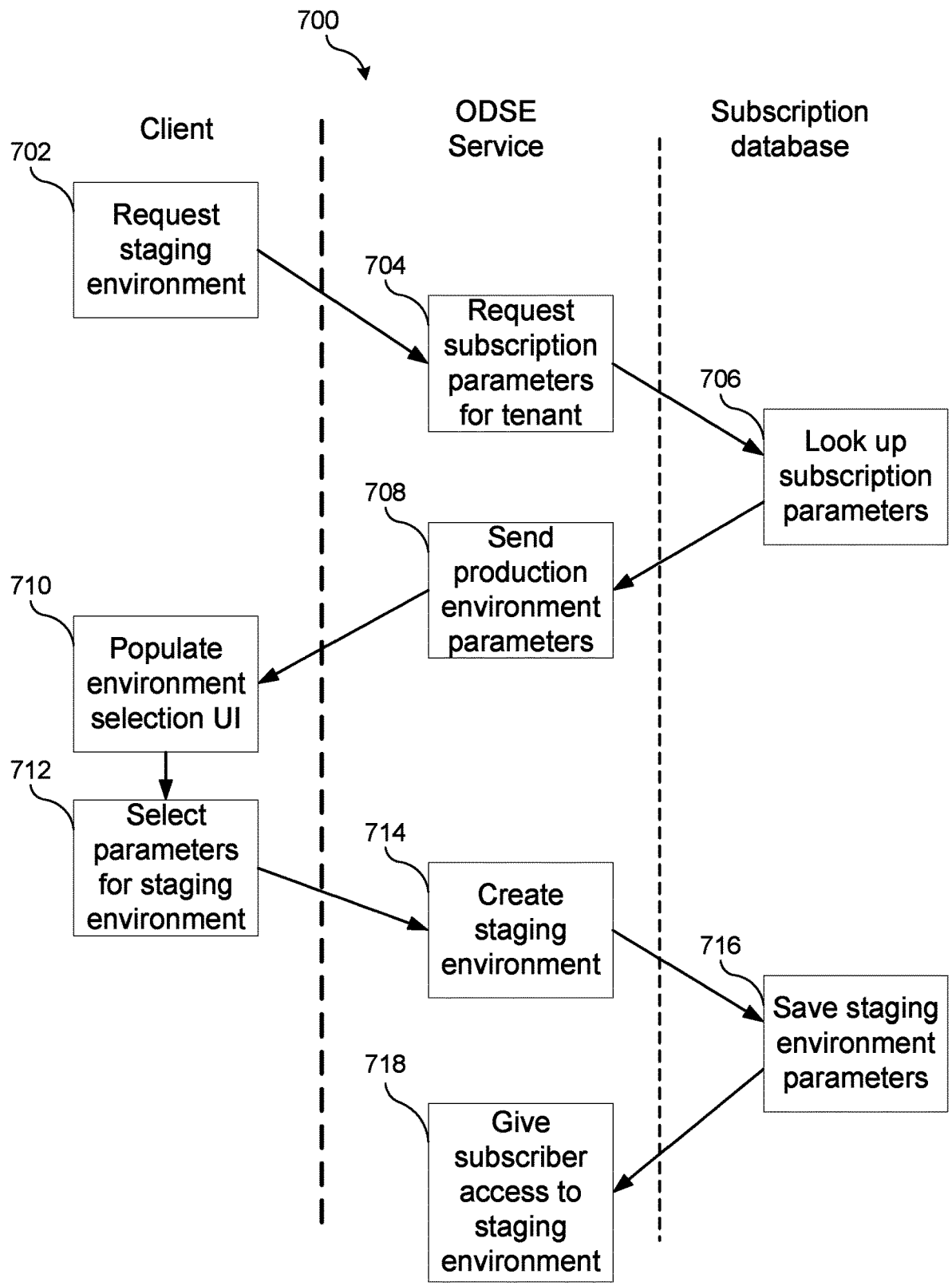
FIG. 7 is a control flow showing the client-side and service-side steps of creating a staging environment.

FIG. 7 is a control flow 700 illustrating how information passes between a client and the ODSE service during construction of a staging environment as described above. First, the client requests creation of a staging environment via the request UI shown in FIG. 3 (step 702). The ODSE service receives this request and responds by accessing a list of subscription parameters for the subscriber's production environment (step 704). As shown in FIG. 7, this step involves checking a subscription database for the ODSE service (step 706), but other implementations may store this data elsewhere. The ODSE service then sends the current parameters for the production environment to the client (step 708), which uses them to populate a selection UI (step 710). The user uses this UI to select parameters for the staging environment (step 712) and sends them back to the ODSE service. The ODSE service creates the new staging environment (step 714) and stores its parameters in the subscription database (step 716). Finally, it grants access to the staging environment to the subscriber (step 718).

Figure 8:
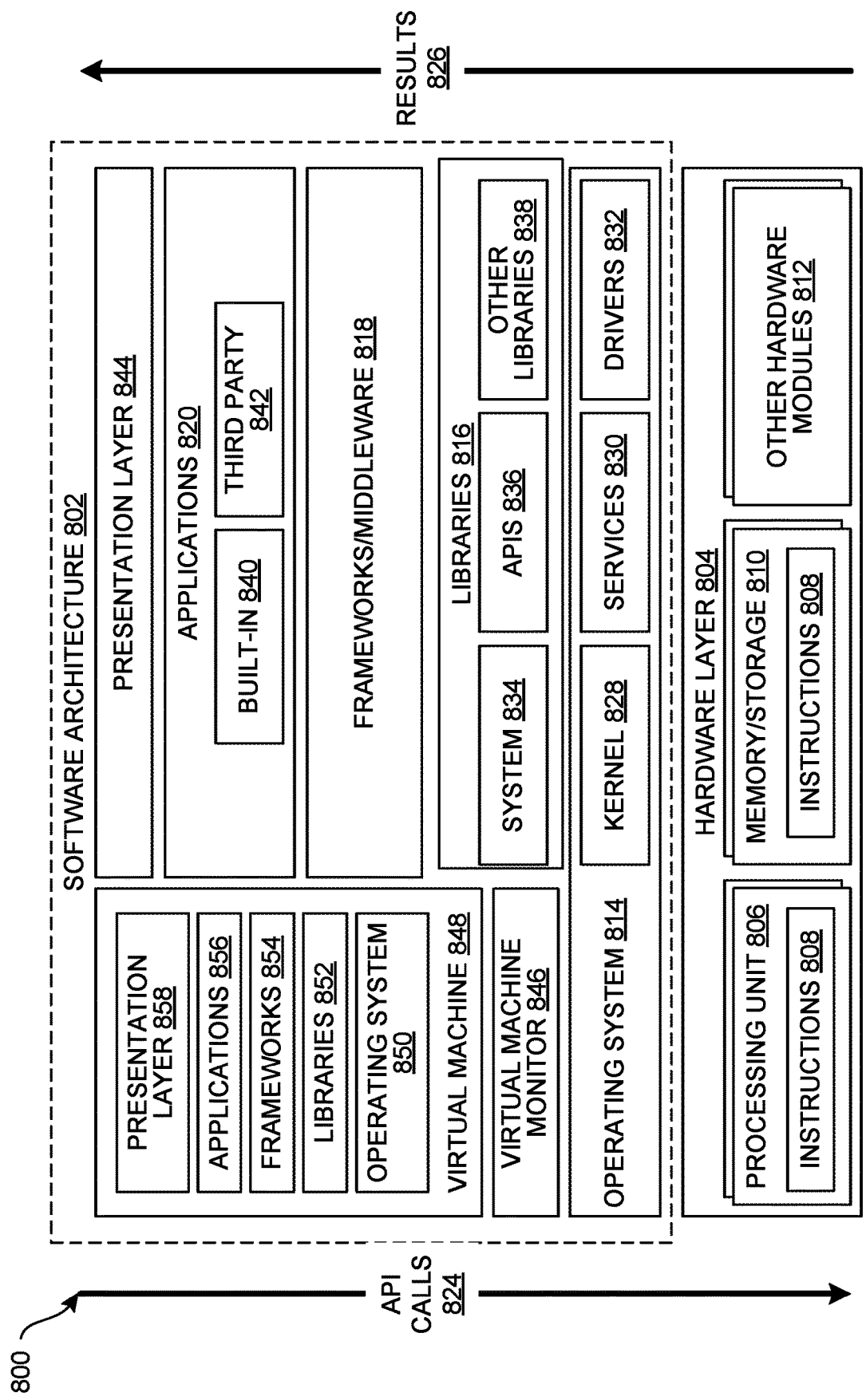
FIG. 8 is a block diagram of an example computing device, which may be used to provide implementations of the systems and methods described herein.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as the cloud service running the methods of FIG. 2 that may include, among other things, document storage, processors, memory, and input/output (I/O) components. A representative hardware layer 804 is illustrated and can represent, for example, the devices described herein. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine. The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
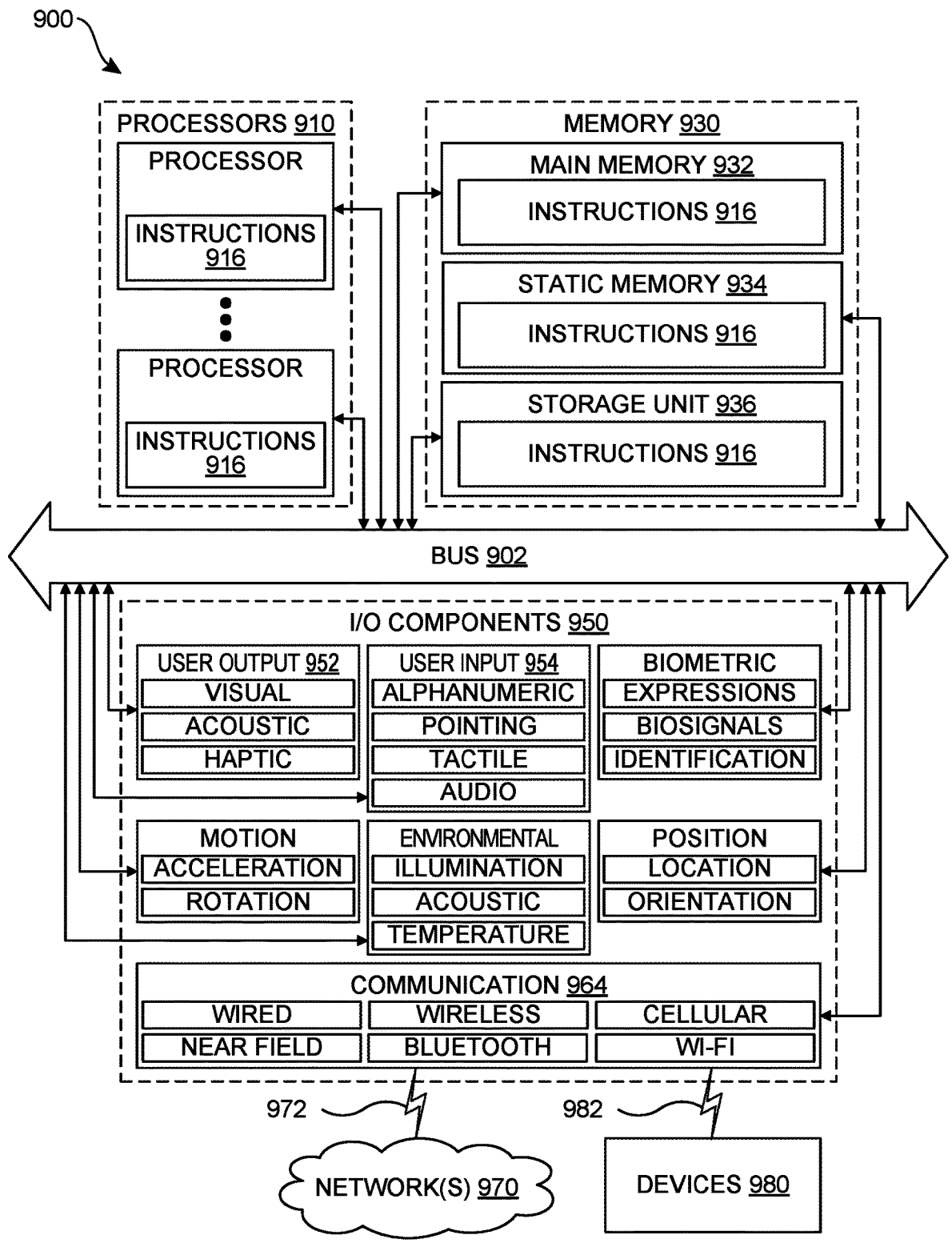
FIG. 9 is a block diagram illustrating components of an example machine configured to read instructions from a machine-readable medium.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954.

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1: A system for providing staging environments to a cloud service subscriber having a production environment, the system including a processor and machine-readable media including instructions. The instructions, when executed by the processor, cause the processor to execute the following steps: Receive a request from the subscriber to create a staging environment via a request user interface (UI). In response to the received request, access information on subscribed services for the subscriber. Present to the subscriber a selection UI showing a set of currently subscribed services for the production environment, the selection UI being populated with the accessed information and configured for selection of subscribed services for inclusion in the staging environment. Receive from the subscriber a selection of a subset of currently subscribed services via the selection UI. In response to reception of the selection of a subset of currently subscribed services, create a new cloud service subscription for a new staging environment including the selected subset of currently subscribed services, the new staging environment being isolated from the production environment and having a setting matching the production environment. Grant the subscriber access to the new cloud service subscription for the new staging environment.

Item 2: The system of item 1, wherein the machine-readable media further includes instructions which, when executed by the processor, cause the processor to: Present to the subscriber a setting UI showing production environment settings. Receive from the subscriber a selection of a subset of production environment settings. Apply the selected subset of production environment settings to the created staging environment.

Item 3: The system of item 1 or 2, wherein the setting UI is configured to show a global setting of the production environment.

Item 4: The system of any of items 1-3, wherein the global setting of the production environment is a setting selected from the group consisting of a number of user licenses, a domain name, a password setting, an admin role assignment, and a mobile app policy.

Item 5: The system of any of items 1-4, wherein the setting UI is configured to show a feature-level setting of the production environment.

Item 6: The system of any of items 1-5, wherein the feature-level setting of the production environment is a setting selected from the group consisting of an external permission, an access control setting, a notification setting, a site creation default, and a storage limit.

Item 7: The system of any of items 1-6, wherein the machine-readable media further includes instructions which, when executed by the processor, cause the processor to offer the subscriber an additional-subscription UI for selecting a service not provided in the production subscription, wherein the additional-subscription UI shows available unsubscribed services that may be added to the new staging environment.

Item 8: The system of any of items 1-7, wherein the machine-readable media further includes instructions which, when executed by the processor, cause the processor to determine whether creating the staging environment with the selected subset of currently subscribed parameters would exceed current subscription limits for the subscriber, and if creating the staging environment would exceed current subscription limits for the subscriber, present to the subscriber a payment UI configured to permit the subscriber to purchase additional resources sufficient to create the staging environment.

Item 9: The system of any of items 1-8, wherein the additional resources are user licenses.

Item 10: A method of constructing a custom staging environment for a subscriber, including the following steps: Receiving a request from the subscriber to construct a staging environment via a request user interface (UI). In response to the received request, identifying a current subscription to cloud services for the subscriber, the identified current subscription including a subscribed set of deployed services. Offering a selection UI allowing the subscriber to select a subset of the subscribed set of deployed services. In response to the subscriber completing the selection UI, creating a new subscription for a staging environment isolated from a production environment including the selected subset, the staging environment having an original configuration including a setting matching the production environment. Adding the created subscription to a list of environments accessible to the subscriber via an environment UI.

Item 11: The method of item 10, wherein creating the new subscription includes identifying a set of user accounts for the new subscription.

Item 12: The method of item 10 or 11, wherein creating the new subscription includes identifying a set of user groups for the new subscription.

Item 13: The method of any of items 10-12, wherein the new subscription includes a cloud service that is not part of the production environment.

Item 14: The method of any of items 10-13, wherein the staging environment is configured for a test of environment performance.

Item 15: The method of any of items 10-14, further including executing the test of environment performance in the staging environment.

Item 16: The method of any of items 10-15, wherein executing the test includes performing a test execution of new code for future implementation in the production environment.

Item 17: The method of any of items 10-16, further including resetting the staging environment to return to the original configuration after executing the test.

Item 18: The method of any of items 10-17, wherein the setting is selected from the group consisting of a number of user licenses, a domain name, a password setting, an admin role assignment, a mobile app policy, an external permission, an access control setting, a notification setting, a site creation default, and a storage limit.

Item 19: A method of creating a custom staging environment on a subscription service for a subscriber, the method including the following steps: Sending a request to the subscription service for creation of a new staging environment. Receiving from the subscription service a services control showing current subscription parameters for a production environment. Using the received services control to select a subset of the subscription parameters for the new staging environment. Receiving a link from the subscription service to the new staging environment, the new staging environment having the selected subset of parameters and being isolated from the production environment.

Item 20: The method of item 19, further comprising selecting a setting for the new staging environment via a setting control showing current settings for the production environment.

While various implementations have been described, the description is intended to be exemplary, rather than limiting, and it is understood that many more implementations are possible that are within the scope of this document. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 1101, 1102, or 1103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for providing staging environments to a cloud service subscriber having a production environment, the system comprising:
    a processor; and
    machine-readable media including instructions which, when executed by the processor, cause the processor to:
        receive a request from the subscriber to create a staging environment via a request user interface (UI);
        in response to the received request, access information on subscribed services for the subscriber;
        present to the subscriber a selection UI showing a set of currently subscribed services for the production environment, the selection UI being populated with the accessed information and configured for selection of subscribed services for inclusion in the staging environment;
        receive from the subscriber a selection of a subset of currently subscribed services via the selection UI;
        in response to reception of the selection of a subset of currently subscribed services, create a new cloud service subscription for a new staging environment including the selected subset of currently subscribed services, the new staging environment being isolated from the production environment and having a setting matching the production environment; and
        grant the subscriber access to the new cloud service subscription for the new staging environment.

2. The system of claim 1, wherein the machine-readable media further includes instructions which, when executed by the processor, cause the processor to:
    present to the subscriber a setting UI showing production environment settings;
    receive from the subscriber a selection of a subset of production environment settings; and
    apply the selected subset of production environment settings to the created staging environment.

3. The system of claim 2, wherein the setting UI is configured to show a global setting of the production environment.

4. The system of claim 3, wherein the global setting of the production environment is a setting selected from the group consisting of:
    a number of user licenses;
    a domain name;
    a password setting;
    an admin role assignment; and
    a mobile app policy.

5. The system of claim 2, wherein the setting UI is configured to show a feature-level setting of the production environment.

6. The system of claim 5, wherein the feature-level setting of the production environment is a setting selected from the group consisting of:
    an external permission;
    an access control setting;
    a notification setting;
    a site creation default; and
    a storage limit.

7. The system of claim 1, wherein the machine-readable media further includes instructions which, when executed by the processor, cause the processor to:
    offer the subscriber an additional-subscription UI for selecting a service not provided in the production subscription wherein the additional-subscription UI shows available additional services that may be added to the new staging environment.

8. The system of claim 1, wherein the machine-readable media further includes instructions which, when executed by the processor, cause the processor to:

determine whether creating the staging environment with the selected subset of currently subscribed parameters would exceed current subscription limits for the subscriber; and if creating the staging environment would exceed current subscription limits for the subscriber, present to the subscriber a payment UI configured to permit the subscriber to purchase additional resources sufficient to create the staging environment.

9. The system of claim 8, wherein the additional resources are user licenses.

10. A method of constructing a custom staging environment for a subscriber, comprising:

receiving a request from the subscriber to construct a staging environment via a request user interface (UI);

in response to the received request, identifying a current subscription to cloud services for the subscriber, the identified current subscription including a subscribed set of deployed services;

offering a selection UI allowing the subscriber to select a subset of the subscribed set of deployed services;

in response to the subscriber completing the selection UI, creating a new subscription for a staging environment isolated from a production environment including the selected subset, the staging environment having an original configuration including a setting matching the production environment; and adding the created subscription to a list of environments accessible to the subscriber via an environment UI.

11. The method of claim 10, wherein creating the new subscription includes identifying a set of user accounts for the new subscription.

12. The method of claim 10, wherein creating the new subscription includes identifying a set of user groups for the new subscription.

13. The method of claim 10, wherein the new subscription includes a cloud service that is not part of the production environment.

14. The method of claim 10, wherein the staging environment is configured for a test of environment performance.

15. The method of claim 14, further comprising executing the test of environment performance in the staging environment.

16. The method of claim 15, wherein executing the test includes performing a test execution of new code for future implementation in the production environment.

17. The method of claim 15, further comprising resetting the staging environment to return to the original configuration after executing the test.

18. The method of claim 10, wherein the setting is selected from the group consisting of:
a number of user licenses;
a domain name;
a password setting;
an admin role assignment;
a mobile app policy;
an external permission;
an access control setting;
a notification setting;
a site creation default; and
a storage limit.

19. A method of creating a custom staging environment on a subscription service for a subscriber, comprising:

sending a request to the subscription service for creation of a new staging environment;

receiving from the subscription service a services control showing current subscription parameters for a production environment;

using the received services control to select a subset of the subscription parameters for the new staging environment; and receiving a link from the subscription service to the new staging environment, the new staging environment having the selected subset of parameters and being isolated from the production environment.

20. The method of claim 19, further comprising selecting a setting for the new staging environment via a settings control showing current settings for the production environment.

* * * * *